US011866298B2

(12) United States Patent
Fauconnet et al.

(10) Patent No.: US 11,866,298 B2
(45) Date of Patent: Jan. 9, 2024

(54) COUNTERWEIGHT HANDOVER TEST DEVICE AND METHOD

(71) Applicant: Otis Elevator Company, Farmington, CT (US)

(72) Inventors: Aurelien Fauconnet, Isdes (FR); Franck Rivoiret, Les bordes (FR)

(73) Assignee: OTIS ELEVATOR COMPANY, Farmington, CT (US)

( * ) Notice: Subject to any disclaimer, the term of this patent is extended or adjusted under 35 U.S.C. 154(b) by 34 days.

(21) Appl. No.: 17/132,237

(22) Filed: Dec. 23, 2020

(65) Prior Publication Data

US 2021/0188596 A1 Jun. 24, 2021

(30) Foreign Application Priority Data

Dec. 23, 2019 (EP) .................................... 19306749

(51) Int. Cl.
*B66B 5/00* (2006.01)
*B66B 1/36* (2006.01)
(Continued)

(52) U.S. Cl.
CPC ............ *B66B 5/0093* (2013.01); *B66B 1/365* (2013.01); *B66B 5/12* (2013.01); *B66B 5/18* (2013.01);
(Continued)

(58) Field of Classification Search
CPC ....... B66B 17/12; B66B 5/0093; B66B 1/365; B66B 5/18; B66B 9/00; B66B 5/12
See application file for complete search history.

(56) References Cited

U.S. PATENT DOCUMENTS 245,676 A 8/1881 Tracy
301,586 A * 7/1884 Giles ......................... B66B 5/22 187/401
(Continued)

FOREIGN PATENT DOCUMENTS

CN 1795137 A * 6/2006 ............... B66B 5/04
FR 2841885 A1 1/2004
(Continued)

OTHER PUBLICATIONS

Definition of "pivot" from dictionary.com, accessed Apr. 24, 2023 (Year: 2023).*
(Continued)

*Primary Examiner* — Michael R Mansen
*Assistant Examiner* — Michelle M Lantrip
(74) *Attorney, Agent, or Firm* — CANTOR COLBURN LLP

(57) ABSTRACT

An elevator counterweight assembly (11) includes a counterweight structure (38), at least one safety brake (12*a*, 12*b*) mounted on the counterweight structure (38), and a safety actuation mechanism (16) including a connection (17) for a suspension member (18). The safety actuation mechanism (16) is configured to move, relative to the counterweight structure (38), between a normal position, and a safety position. In the safety position the safety actuation mechanism (16) is arranged to actuate the at least one safety brake (12*a*, 12*b*) and thereby brake the counterweight structure (38). The counterweight assembly (11) also includes a mechanical actuator (22), configured, when actuated, to apply a force to the safety actuation mechanism (16) and thereby move the safety actuation mechanism (16) from the normal position to the safety position, e.g. for the purposes of a handover test.

14 Claims, 9 Drawing Sheets

(51) Int. Cl.

| | |
|---|---|
| ***B66B 5/18*** | (2006.01) |
| ***B66B 9/00*** | (2006.01) |
| ***B66B 11/02*** | (2006.01) |
| ***B66B 17/12*** | (2006.01) |
| ***B66B 5/12*** | (2006.01) |

(52) U.S. Cl.
CPC .............. *B66B 9/00* (2013.01); *B66B 11/024* (2013.01); *B66B 17/12* (2013.01)

(56) References Cited

U.S. PATENT DOCUMENTS

| | | | | |
|---|---|---|---|---|
| 505,289 | A * | 9/1893 | Finney | B66B 5/22 187/377 |
| 620,364 | A | 2/1899 | Rolff | |
| 996,050 | A * | 6/1911 | Bisceglia et al. | B66B 5/22 187/372 |
| 1,081,312 | A | 12/1913 | Kalnasi | |
| 1,382,211 | A * | 6/1921 | Miller | B66B 5/18 187/373 |
| 5,495,919 | A * | 3/1996 | Ericson | B66B 5/16 187/373 |
| 6,691,833 | B1 * | 2/2004 | Elsener | B66B 11/0246 187/254 |
| 6,880,678 | B1 * | 4/2005 | Schneider | B66B 11/0246 187/314 |
| 2007/0056810 | A1 * | 3/2007 | Fernandes | B66B 11/0246 187/401 |
| 2020/0079621 | A1 * | 3/2020 | Kalliomäki | B66B 5/22 |

FOREIGN PATENT DOCUMENTS

| | | | | |
|---|---|---|---|---|
| WO | WO-2006082460 | A1 * | 8/2006 | B66B 5/04 |
| WO | WO-2017005327 | A1 * | 1/2017 | B66B 11/0246 |

OTHER PUBLICATIONS

European Search Report for Application No. 19306749.3; dated Jun. 23, 2020; 9 Pages.

* cited by examiner

COUNTERWEIGHT HANDOVER TEST DEVICE AND METHOD

FOREIGN PRIORITY

This application claims priority to European Patent Application No. 19306749.3, filed Dec. 23, 2019, and all the benefits accruing therefrom under 35 U.S.C. § 119, the contents of which in its entirety are herein incorporated by reference.

TECHNICAL FIELD OF INVENTION

This disclosure relates to a device and method for performing a handover test on a counterweight of an elevator system.

BACKGROUND OF THE INVENTION

It is a requirement of the elevator safety code EN81-20 to perform a handover test on an elevator counterweight. A handover test is to be carried out once an elevator system has been assembled on site by an elevator field mechanic, in order to check it is operating correctly, before the elevator system is then handed over to the customer. The test is then often repeated at regular intervals, for example once a year, by a maintenance person.

In carrying out the handover test, it is required to test that the safety brakes (or safeties) of the counterweight correctly engage the counterweight guide rails. It is known in the art to test this by suspending the elevator car at the top of the hoistway e.g. by hanging the elevator car from a hook at the top of the hoistway e.g. from a hook used during lift installation, so that the counterweight is at the bottom of the hoistway above the pit. A jack is then placed in the pit and remotely controlled to lift the counterweight, causing the rope suspending the counterweight to go slack. The slack in the rope should cause the safeties of the counterweight to engage. In this position the maintenance person can then re-enter the pit and use a ladder to access the counterweight safeties and check that the safeties have engaged correctly, and if they have the test is considered to have been passed.

It would be desirable to provide an improvement in which this handover test could be carried out in a simpler and safer manner, and without requirement for a jack and a ladder. Providing a system in which the handover test can be carried out without a jack or ladder would also represent a cost reduction, since the safety code currently requires a supplier to supply these items with a unit, in order to facilitate the handover test.

SUMMARY OF THE INVENTION

According to a first aspect of this disclosure there is provided an elevator counterweight assembly, comprising: a counterweight structure; at least one safety brake mounted on the counterweight structure; a safety actuation mechanism, comprising a connection for a suspension member, wherein the safety actuation mechanism is configured to move, relative to the counterweight structure, between a normal position, and a safety position, wherein in the safety position the safety actuation mechanism is arranged to actuate the at least one safety brake and thereby brake the counterweight structure; and a mechanical actuator, configured, when actuated, to apply a force to the safety actuation mechanism and thereby move the safety actuation mechanism from the normal position to the safety position.

According to a second aspect of this disclosure there is provided a method of carrying out a handover test for an elevator counterweight assembly, the method comprising: actuating a mechanical actuator to apply a force to a safety actuation mechanism, comprising a connection for a suspension member, and thereby move the safety actuation mechanism, relative to a counterweight structure, from a normal position to a safety position, wherein in the safety position the safety actuation mechanism is arranged to actuate at least one safety brake and thereby brake the counterweight structure; and checking that the at least one safety brake is correctly actuated.

It will be appreciated that, according to the present disclosure, a mechanical actuator is provided which enables a maintenance person to move the safety actuation mechanism of a counterweight between a normal position and a safety position, by actuating the mechanical actuator, and which therefore provides a simple and easy method of directly testing that the safety actuation mechanism is functioning correctly.

The safety actuation mechanism comprises the connection (e.g. sheave or hitch) for a suspension member. Thus, in use, under normal circumstances, the connection is lifted due to tension in the suspension member, and therefore the safety actuation mechanism is in the normal position (i.e. lifted upwards relative to the counterweight structure). During operation of the elevator system, if the suspension member suddenly goes slack and loses tension, the connection will no longer be lifted by tension in the suspension member, and the connection (and therefore the safety actuation mechanism) will drop under gravity, and optionally also due to a force provided by one or more biasing springs, to the safety position, in which (if everything is functioning correctly) the safety brakes will be deployed. The mechanical actuator according to the present disclosure allows the result of a slack suspension member (i.e. the movement of the safety actuation mechanism to the safety position) to be re-created (i.e. simulated), and therefore allows a maintenance person to test that the safety actuation mechanism functions correctly to deploy the at least one safety brake.

According to the present disclosure the safety actuation mechanism is configured to move relative to the counterweight structure, between a normal position, and a safety position. It will be understood by the skilled person that it is therefore only required that one of these components moves relative to the other, it is not important which of these components "actually" moves e.g. moves with respect to the frame of reference of the hoistway. For example, it may be that in a fault scenario which occurs during normal operation of the elevator system, the connection (e.g. counterweight sheave), and thus the safety actuation mechanism, moves downwards in the hoistway (faster than the counterweight structure), thus creating relative movement such that the safety actuation mechanism moves between the normal position and the safety position. It may be, however, that when the mechanical actuator is used to move the safety actuation mechanism from the normal position to the safety position, it is the counterweight structure which moves upwards (relative to the hoistway frame of reference) and the connection (e.g. counterweight sheave) is held in position by tension in the suspension member so the safety actuation mechanism remains stationary.

It will furthermore be understood by the skilled person that the mechanical actuator is arranged to apply a force to the safety actuation mechanism, and thus that it is the mechanical actuator itself which applies the force, which is the same force which moves the safety actuation mechanism i.e. it is a direct mechanical force. This is in contrast to the situation where a jack or other mechanical actuator is used to apply a first force (e.g. lifting the counterweight structure), which then allows a second force (e.g. gravity and/or spring force) to move the safety actuation mechanism from the normal position to the safety position.

In some examples, the mechanical actuator is arranged to move between a retracted position and an extended position, wherein, in the extended position, the mechanical actuator applies a force to the safety actuation mechanism. In some examples, additionally or alternatively, the mechanical actuator maintains its position relative to the counterweight structure unless actuated to move relative to the counterweight structure and thereby apply a force to the safety actuation mechanism. In some examples, additionally or alternatively, the motion of the safety actuation mechanism is reversible.

In some examples, the mechanical actuator may comprise a ratchet. In some examples, the mechanical actuator may comprise a piston. In some examples, the mechanical actuator may comprise a gas spring or mechanical spring that is manually released to apply a force to the safety actuation mechanism. In some examples, the mechanical actuator may comprise a moveable wedge.

In some examples, in addition or alternatively, the mechanical actuator is rotationally driven to produce a linear force. Thus, the method according to the present disclosure may comprise driving the mechanical actuator rotationally, to produce a linear force. In one or more examples, the mechanical actuator may comprise a screw mechanism. Any suitable screw mechanism may be used, for example, comprising a cylindrical shaft with helical threads around the outside of the shaft. Optionally, the screw mechanism may comprise a worm screw, or one or more screws or bolts. Thus, the method according to the present disclosure may comprise actuating the screw mechanism, e.g. by hand or using a tool such as a crank, screwdriver or spanner. The use of a screw mechanism as the mechanical actuator provides the advantages that a screw mechanism is small and can therefore be easily accommodated adjacent to the safety actuation mechanism without interfering with the suspension member connection, and furthermore that a screw mechanism is easily actuated using standard tools.

In some examples, in addition or alternatively, the mechanical actuator further comprises a pressure bar configured to contact the safety actuation mechanism in at least two positions, so as to distribute the force which is applied by the mechanical actuator to the safety actuation mechanism. Optionally, the pressure bar contacts the connection in at least two positions. This provides a particularly simple arrangement, in which the mechanical actuator is arranged to apply force to the safety actuation mechanism, but in such a way that localised wear or damage to the connection is reduced, or eliminated. In some examples, additionally or alternatively, the connection may be a counterweight sheave. The pressure bar may be arranged to contact either end of the counterweight sheave. Alternatively, the connection may be an end hitch of a suspension member.

In some examples, in addition or alternatively, there may be a single mechanical actuator. Alternatively, there may be more than one mechanical actuator, optionally two mechanical actuators. In some examples, the one or more mechanical actuators are located centrally on the elevator counterweight assembly.

In some examples, in addition or alternatively, the safety actuation mechanism comprises at least one lever, wherein the at least one safety brake comprises a safety brake arm, and wherein the at least one lever contacts the safety brake arm, such that when the safety actuation mechanism moves between the normal position and the safety position, the at least one lever is moved, thereby moving the safety brake arm, which causes actuation of the safety brake. Optionally, the safety actuation mechanism comprises a first lever and a second lever, wherein the first and second levers are located on opposing sides of the safety actuation mechanism, wherein the elevator counterweight assembly comprises a first safety brake, comprising a first safety brake arm contacted by the first lever, and a second safety brake comprising a second safety brake arm contacted by the second lever. Optionally, the mechanical actuator is located centrally between the first lever and the second lever. This helps to apply a balanced force, thus avoiding damage caused by imbalance e.g. bending. In addition or alternatively, the connection is located centrally between the first lever and the second lever. Thus, if both the connection and the mechanical actuator are located centrally, the mechanical actuator is able to apply balanced force directly to the connection.

In some examples, in addition or alternatively, the safety actuation mechanism further comprises at least one biasing spring, configured to bias the safety actuation mechanism towards the safety position. Optionally, the safety actuation mechanism comprises a first biasing spring, located at a first side of the connection, and a second biasing spring, located at a second, opposing side of the connection.

In some examples, in addition or alternatively, the counterweight structure comprises at least one weight supported by a pair of uprights, wherein the safety actuation mechanism is mounted between the pair of uprights. In some examples, in addition or alternatively, the counterweight structure comprises an upper crosshead, on which the mechanical actuator is mounted.

According to a further aspect of this disclosure there is provided an elevator system comprising: an elevator car; an elevator counterweight assembly according to the present disclosure; and a suspension member connected to the elevator car and to the connection of the safety actuation mechanism.

In some examples, the elevator car defines an interior space for accommodating passengers and/or cargo, the elevator car comprising a working platform moveable between a stowed position, above the interior space, and an operational position, suspended within the interior space.

In some examples, the method according to the present disclosure further comprises moving an elevator car in a hoistway to be adjacent to the elevator counterweight assembly; and deploying a working platform within the elevator car, the working platform being in an operational position, allowing a person standing on the working platform to access the mechanical actuator of the elevator counterweight assembly. For example, the elevator car and elevator counterweight assembly may both be moved to a mid-rise position.

This advantageously enables a maintenance person to carry out testing and maintenance on the elevator counterweight assembly without having to enter the hoistway. Furthermore, by using the mechanical actuator of the present disclosure, the maintenance person is able to test the counterweight without having to use tools which may be heavy and cumbersome or not easily accessible e.g. a ladder or a hydraulic jack. This improves both efficiency and safety for the handover test, by avoiding pit access and allowing a maintenance person to engage the at least one safety brake for test purposes from the working platform inside the elevator car.

BRIEF DESCRIPTION OF THE DRAWINGS

Certain preferred examples of this disclosure will now be described, by way of example only, and with reference to the accompanying drawings, in which.

DETAILED DESCRIPTION OF THE INVENTION

Figure 1:
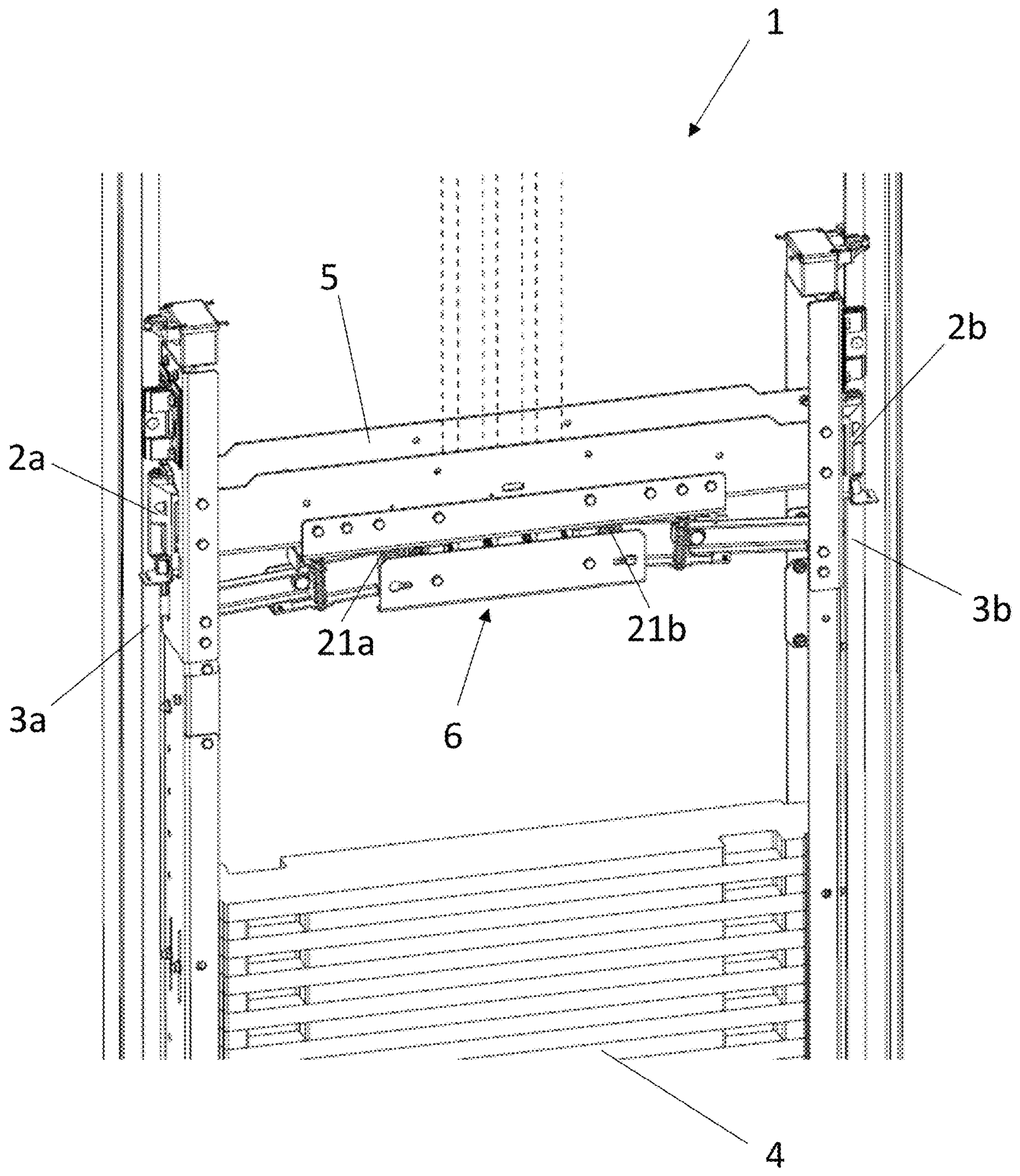
FIG. 1 is a perspective view of a counterweight including safety brakes, as is known in the art.
Figure 2:
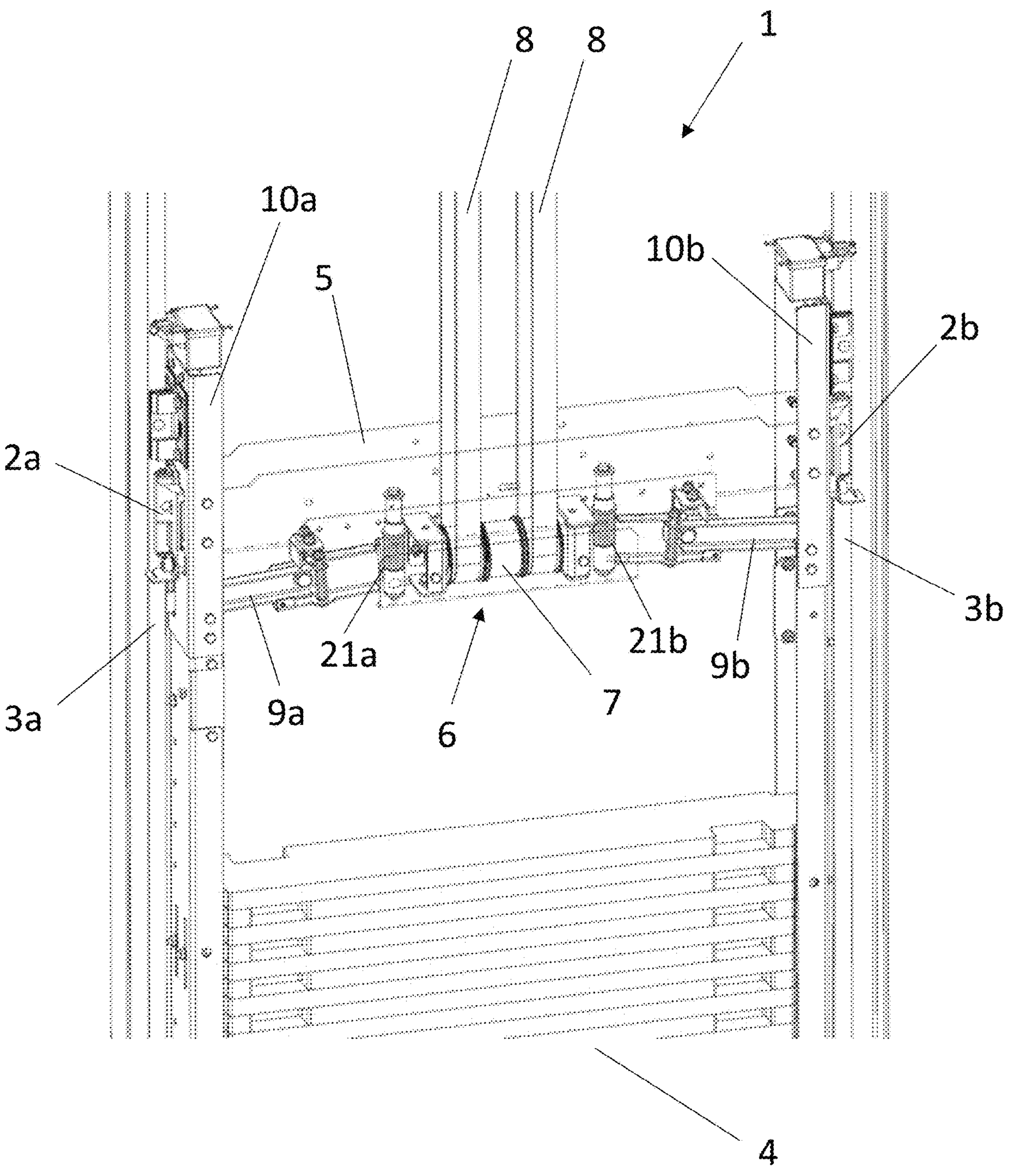
FIG. 2 is a cutaway view of the counterweight of FIG. 1.

FIG. 1 shows a counterweight 1 including safety brakes 2*a* and 2*b*, which, when engaged, grip counterweight guide rails 3*a* and 3*b*, as is known in the art. The counterweight includes weights 4, which are supported on a lower crosshead (not shown). The counterweight also includes an upper crosshead 5, below which is arranged a safety actuation mechanism 6. The operation of the safety actuation mechanism 6 can be described more clearly with reference to FIG. 2, in which the same components have been indicated with the same reference numerals as FIG. 1.

The safety actuation mechanism 6 includes a counterweight sheave 7 and a pair of suspension members 8, arranged to contact the counterweight sheave 7 and thereby suspend the counterweight 1. The counterweight sheave 7 is attached on each side to a lever 9*a*, 9*b*, which each contact a respective safety brake arm (not seen in FIG. 1), extending downwards from safety brakes 2*a*, 2*b*. In the event of a malfunction of the elevator system causing the suspension members 8 to lose tension and go slack, the counterweight sheave 7 will no longer be lifted by tension in the suspension members 8. The counterweight assembly 1 further includes a pair of biasing springs 21*a* and 21*b*, arranged at opposing sides of the counterweight sheave 7. When there is tension in the suspension members 8, this tension acts to compress the springs 21*a*, 21*b*, and keep the counterweight sheave 7 lifted upwards. When there is no tension, nothing resists the biasing springs 21*a*, 21*b* expanding, and therefore the biasing springs 21*a*, 21*b*, which were previously compressed, then expand, pushing the counterweight sheave 7 downwards (together with gravity), towards the safety position. As a result, the counterweight sheave 7 will drop i.e. move downwards, away from the upper crosshead 5 i.e. the counterweight sheave 7 will move relative to the rest of the counterweight 1, including relative to the safety brakes 2*a*, 2*b*, which are fixed onto the uprights 10*a*, 10*b* of the counterweight 1. As a result of this relative movement, the levers 9*a*, 9*b* will pivot about their respective pivot points, and will therefore move the safety brake arms so as to actuate the safety brakes 2*a*, 2*b*, in a known manner, causing the safety brakes 2*a*, 2*b*, if functioning correctly, to engage with the guide rails 3*a*, 3*b*. This results in an emergency stop of the counterweight 1.

It is desirable to be able to regularly test the function of the safety actuation mechanism 6 i.e. to test that downwards movement of the counterweight sheave 7 does in fact result in automatic actuation of the safety brakes 2*a*, 2*b*. An elevator counterweight assembly including a simple and safe testing mechanism according to the present disclosure is shown in FIGS. 3-9.

Figure 3:
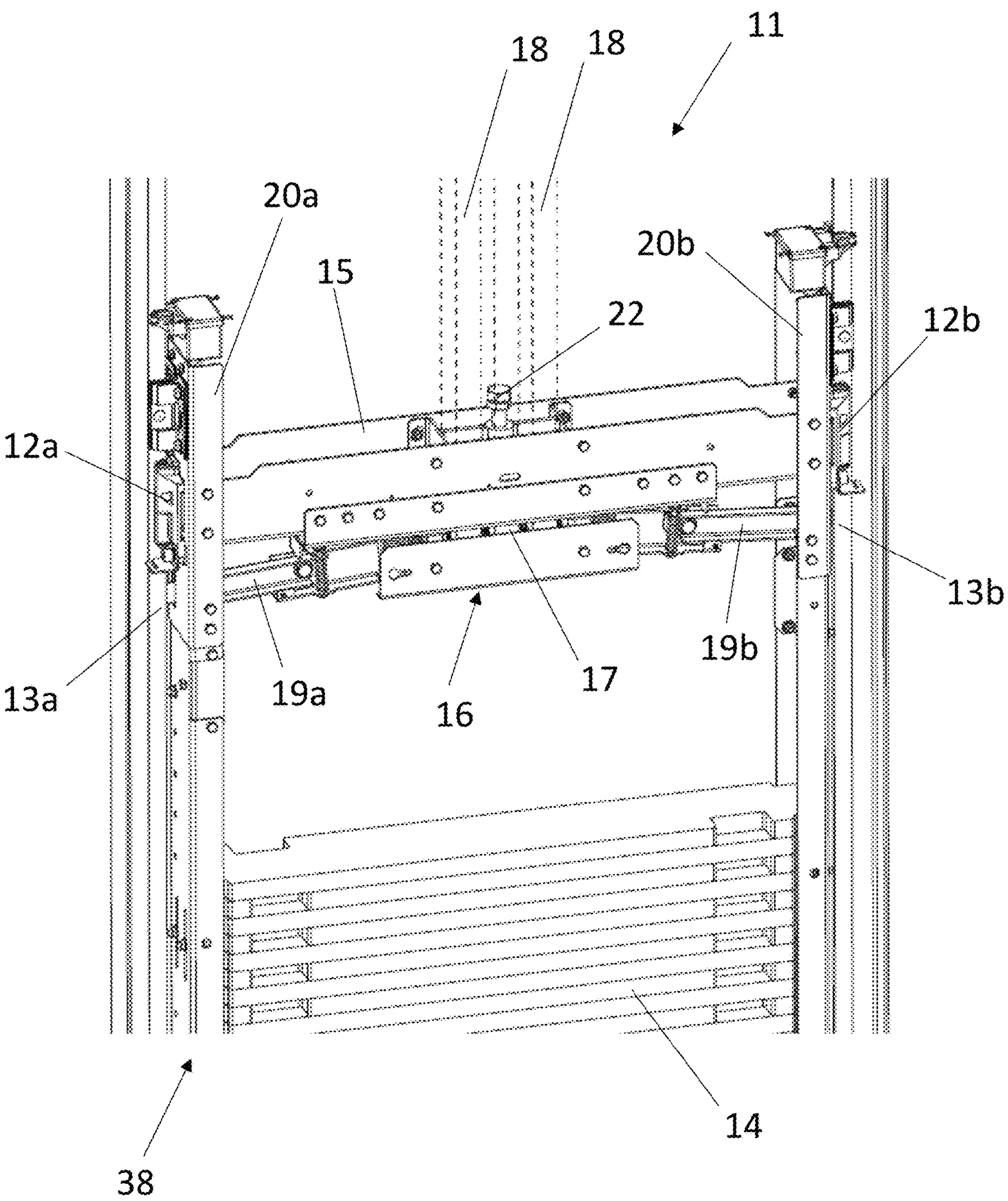
FIG. 3 is a perspective view of an elevator counterweight assembly according to an aspect of the present disclosure, in a normal position.
Figure 4:
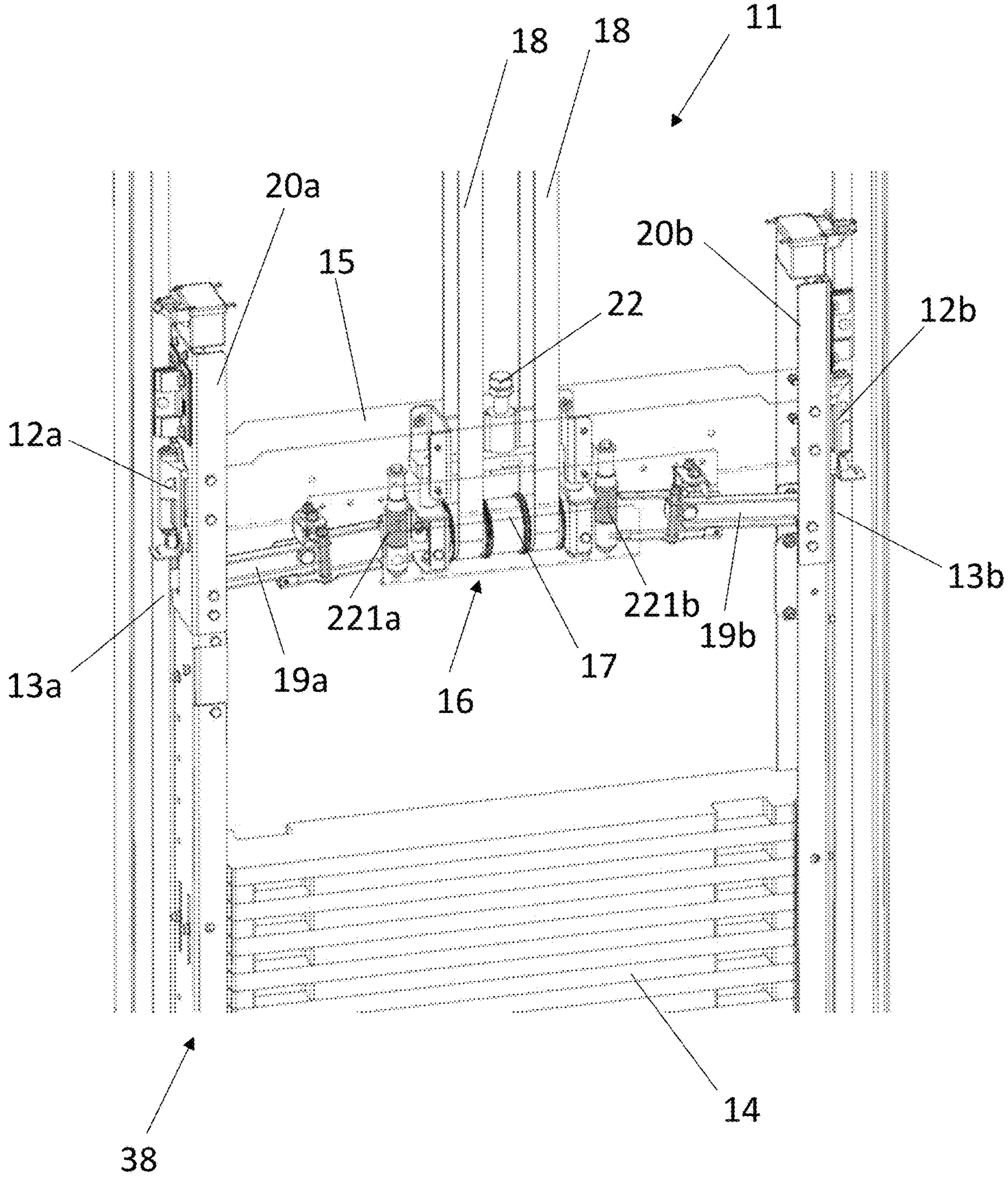
FIG. 4 is cutaway view of the elevator counterweight assembly of FIG. 3.

The elevator counterweight assembly 11 of FIGS. 3-9 includes a counterweight structure 38, including uprights 20*a*, 20*b* and safety brakes 12*a* and 12*b* which are mounted on the uprights 20*a*, 20*b*. The counterweight structure 38 also includes an upper crosshead 15 and a lower crosshead (not shown). When engaged, the safety brakes 12*a*, 12*b* grip counterweight guide rails 13*a* and 13*b*. The counterweight structure 38 also includes weights 14, which are supported on the lower crosshead. Typically these weights are such that the counterweight is heavier than the elevator car, e.g. approximately equal to the weight of the elevator car plus half of the maximum load of the elevator car. This is so that the counterweight balances the weight of the elevator car even when the elevator car is carrying passengers or other load. A safety actuation mechanism 16 is arranged below the upper crosshead 15. The safety actuation mechanism 16 includes a connection 17 suitable for connecting to one or more suspension members 18 (e.g. ropes or belts). The connection 17 in this example is a counterweight sheave, around which the suspension members 18 are passed. The safety actuation mechanism 16 further comprises at least one biasing spring 221*a*, 221*b*, configured to bias the safety actuation mechanism 16 towards the safety position. As seen in FIG. 4, there is a first biasing spring 221*a* located at a first side of the connection 17, and a second biasing spring 221*b* located at a second, opposing side of the connection 17. The connection 17 is attached on each side to a lever 19*a*, 19*b*, which each contact a respective safety brake arm 26*a*, 26*b* (seen in FIG. 5), extending downwards from the safety brakes 2*a*, 2*b*. The operation of the safety actuation mechanism 16 in a malfunction situation is analogous to the operation of the safety actuation mechanism 6, described with reference to FIGS. 1 and 2.

In the event of a malfunction of the elevator system causing the suspension members 18 to lose tension and go slack, the connection 17 will no longer be lifted by tension in the suspension members 18. There is therefore no longer any force acting to compress biasing springs 221*a*, 221*b*, located on either side of the connection 17. The biasing springs 221*a*, 221*b* therefore expand, pushing the connection 17 downwards (along with gravity acting to pull the connection 17 downwards). As a result, the connection (e.g. counterweight sheave) 17 will drop i.e. move downwards, away from the upper crosshead 15 i.e. the connection (e.g. counterweight sheave) 17 will move relative to the counterweight structure 38, including relative to the safety brakes 12*a*, 12*b*, which are fixed onto the uprights 20*a*, 20*b* of the elevator counterweight assembly 11. This "downward" position of the safety actuation mechanism 16 relative to the counterweight structure 38 is referred to as the "safety position". As a result of the relative movement, the levers 19*a*, 19*b* will pivot about their respective pivot points, and will therefore move the safety brake arms 26*a*, 26*b* of the safety brakes 12*a*, 12*b*. This actuates the safety brakes 12*a*, 12*b*, causing the safety brakes, if functioning correctly, to engage with the guide rails 13*a*, 13*b*. This results in an emergency stop of the elevator counterweight assembly 11.

The elevator counterweight assembly 11 of FIGS. 3-9 includes an additional component, a mechanical actuator 22, which can be used in order to manually test the functioning of the safety actuation mechanism 16 in a safe and simple manner. The mechanical actuator 22, as well as the connection 17, can be seen more clearly in FIG. 4, which shows a cutaway view of the elevator counterweight assembly 11.

Figure 5:
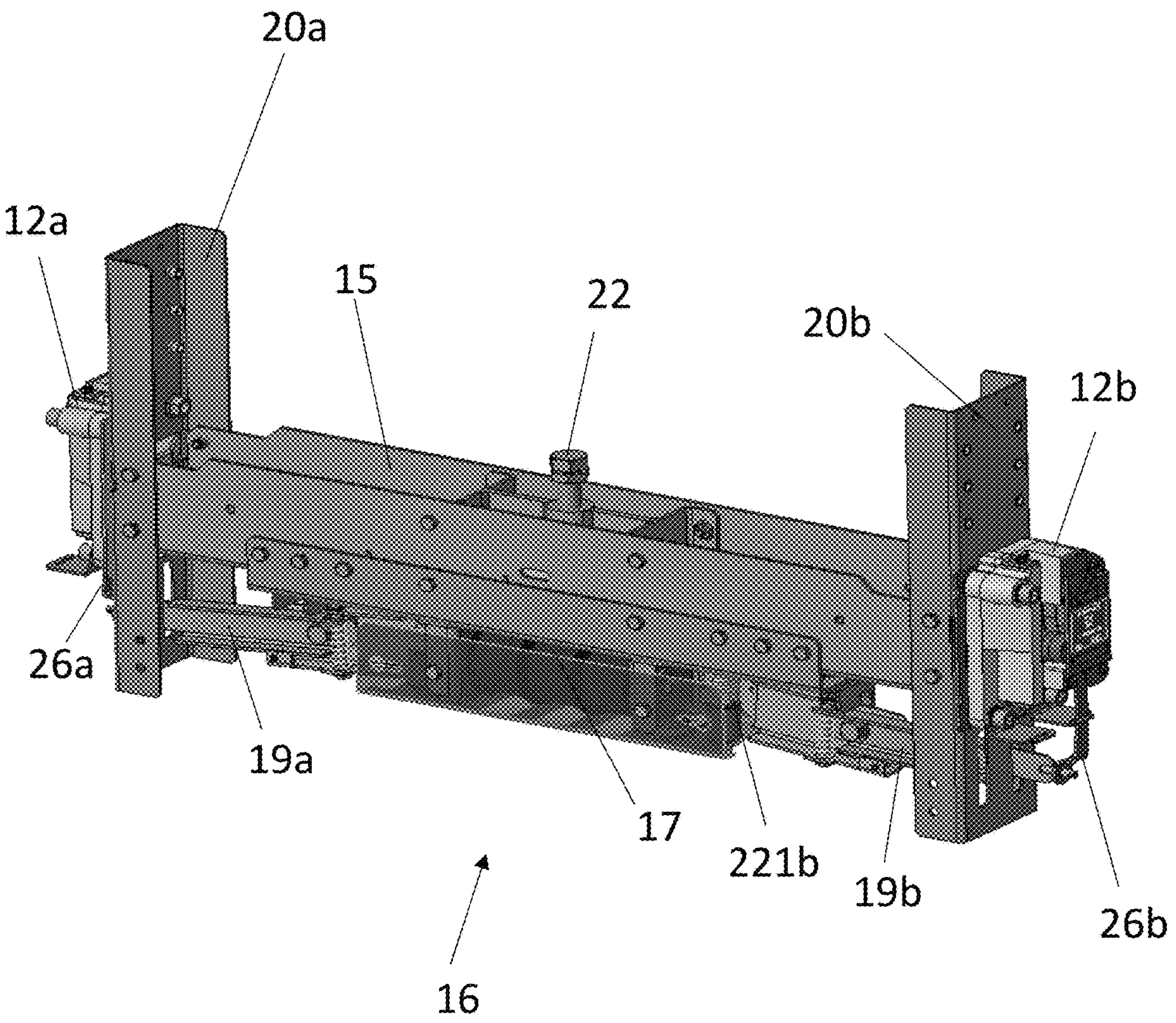
FIG. 5 is a perspective view of the upper part of the elevator counterweight assembly shown in FIGS. 3 and 4.

FIG. 5 shows in more detail the upper part of the elevator counterweight assembly 11, specifically the upper crosshead 15 and the safety actuation mechanism 16, together with the safety brakes 12*a*, 12*b*. The safety brake arms 26*a*, 26*b* can be seen more clearly in FIG. 5, particularly the second safety brake arm 26*b*.

Figure 6:
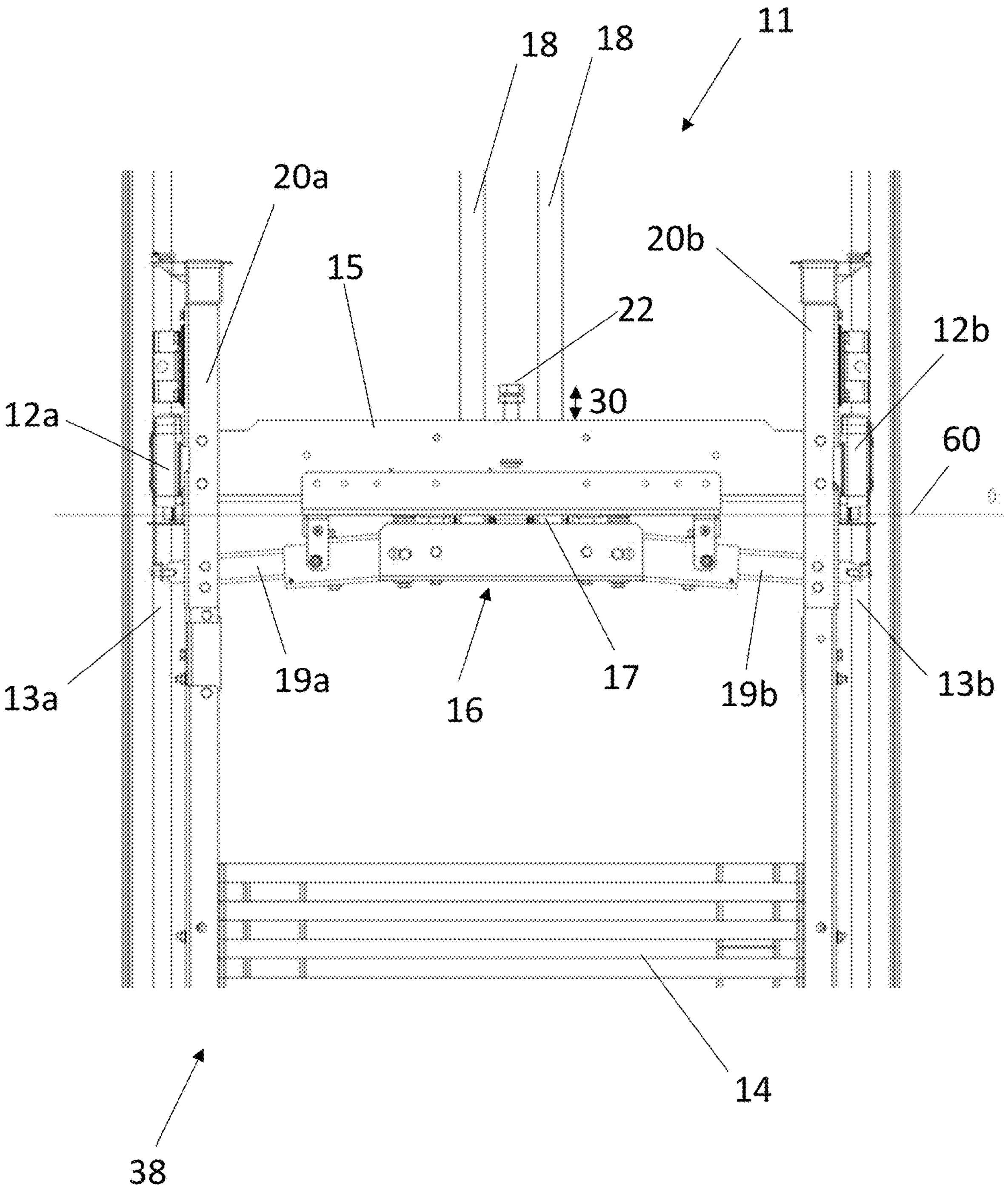
FIG. 6 is a front view of the elevator counterweight assembly of FIGS. 3 and 4, in the normal position.

FIG. 6 is a front view of the elevator counterweight assembly 11 as shown in FIGS. 3 and 4, and the top of which is shown in FIG. 5. In all of these Figures, the safety actuation mechanism 16 is in the normal position. In this normal position, as shown, the levers 19*a*, 19*b* are angled downwards, such that the safety brake arms 26*a*, 26*b* which they contact are extended from the safety brakes 12*a*, 12*b* in their normal position.

The mechanical actuator 22 is shown in its normal position, in which it does not apply any force to the safety actuation mechanism 16. In this position, the mechanical actuator 22 extends a first distance 30 above the upper crosshead 15. This distance may, for example, be approximately 50 mm.

As described above, in the event of an emergency which results in the counterweight suspension members 18 losing tension and going slack, the safety actuation mechanism 16 will move relative to counterweight structure 38 (i.e. the rest of the counterweight), actuating the safety brakes 12*a*, 12*b*. The mechanical actuator 22 according to the present disclosure provides a mechanism by which to create relative movement between the safety actuation mechanism 16 and the counterweight structure 38, and to therefore test that this relative movement causes the safety brakes 12*a*, 12*b* to be applied, as it should if everything is functioning properly.

For this purpose, the mechanical actuator 22 can be actuated to apply a force to the safety actuation mechanism 16, specifically to the connection 17, which in the example shown is a counterweight sheave.

Figure 7:
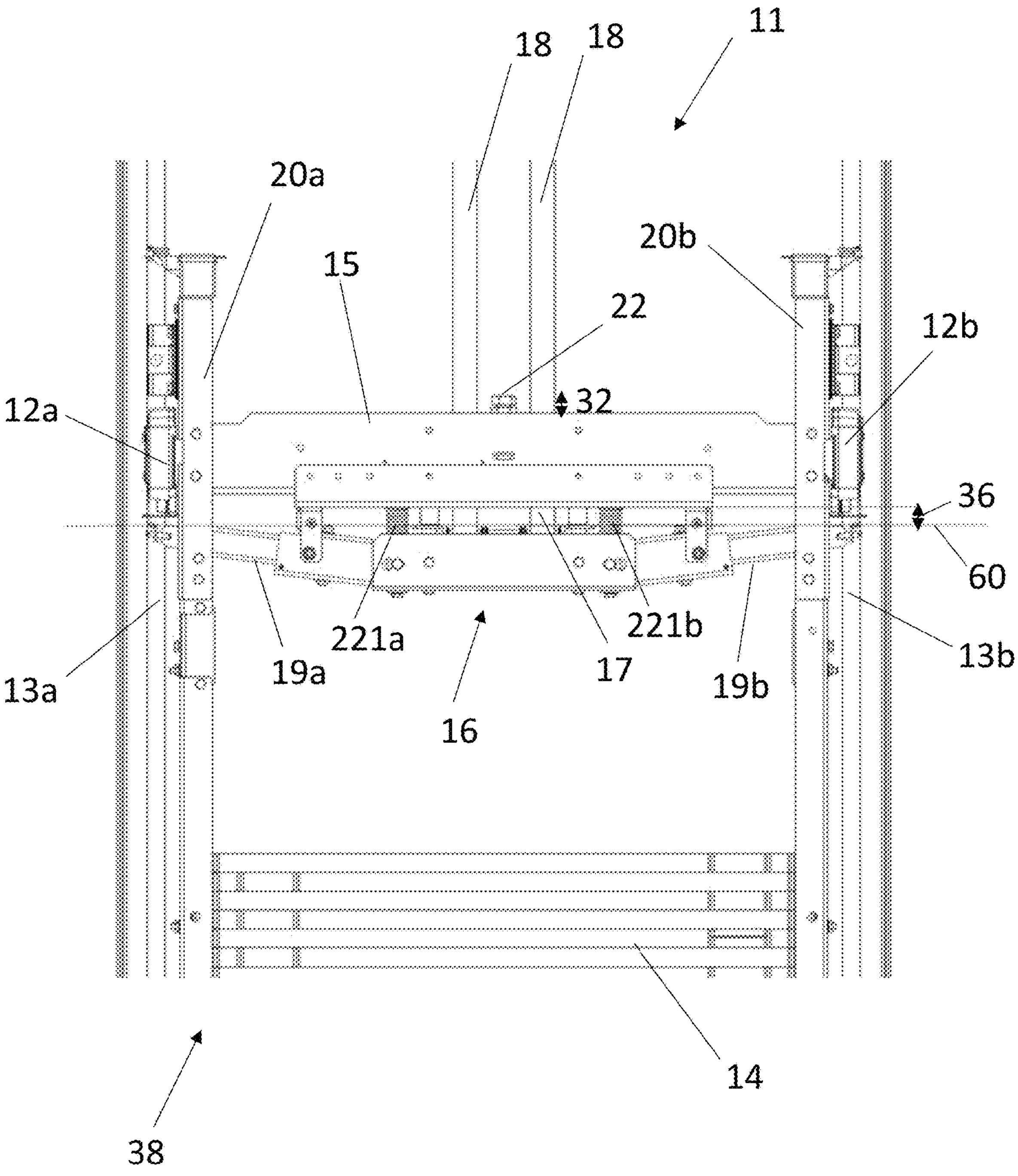
FIG. 7 is a front view of the elevator counterweight assembly of FIGS. 3, 4, and 6, in a safety position.

FIG. 7 is a front view of the elevator counterweight assembly 11 as shown in FIG. 6, in which now the mechanical actuator 22 has been actuated so as to move the safety actuation mechanism 16 into the safety position. In this case, in which the safety actuation mechanism 16 has been intentionally moved for the purposes of testing, this position may also be referred to as the "test position". The mechanical actuator 22 in its actuated position extends a second, smaller, distance 32 above the upper crosshead 15. This distance may, for example, be approximately 10 mm. Thus, the movement distance 36 which the mechanical actuator 22 is moved in order to apply a force to the safety actuation mechanism 16 i.e. the total relative movement distance, is the first distance 30 minus the second distance 32, which may, for example, result in a movement distance 36 of approximately 40 mm.

As described above, in order to engage the safety brakes 12*a*, 12*b* all that is required is a relative movement between the safety actuation mechanism 16 and the safety brakes 12*a*, 12*b* mounted on the uprights 20*a*, 20*b* of the counterweight structure 38. Thus, although it may be that a slack rope during normal operation will cause the safety actuation mechanism 16 to move downwards relative to the counterweight structure 38, considered from the frame of reference of the hoistway, in the handover test procedure as described herein, it is the counterweight structure 38 (e.g. including the uprights 20*a*, 20*b* and the weights 14), which is actually moved upwards relative to the safety actuation mechanism 16, in particular relative to the connection 17 (e.g. counterweight sheave), which is held at an absolute position in the hoistway due to tension in the suspension members 18. This is represented by the position reference line 60, which is represented in FIGS. 6 and 7. Using this reference line 60 it can be clearly seen that the connection 17 remains stationary in the hoistway, and as the mechanical actuator 22 is actuated and applies a force downwards onto the safety actuation mechanism 16, this force cannot move the connection 17 downwards, due to the tension in the suspension member 18, and the force therefore lifts the counterweight structure 38 relative to the safety actuation mechanism 16.

This relative movement results in the same pivoting of the levers 19*a*, 19*b*, as occurs in response to a slack rope scenario during operation of the elevator system, and therefore should result in the engaging of the safety brakes 12*a*, 12*b*. Thus, the mechanical actuator 22 can be used to test the operation of the safety actuation mechanism 16 at any given time.

Figure 8:
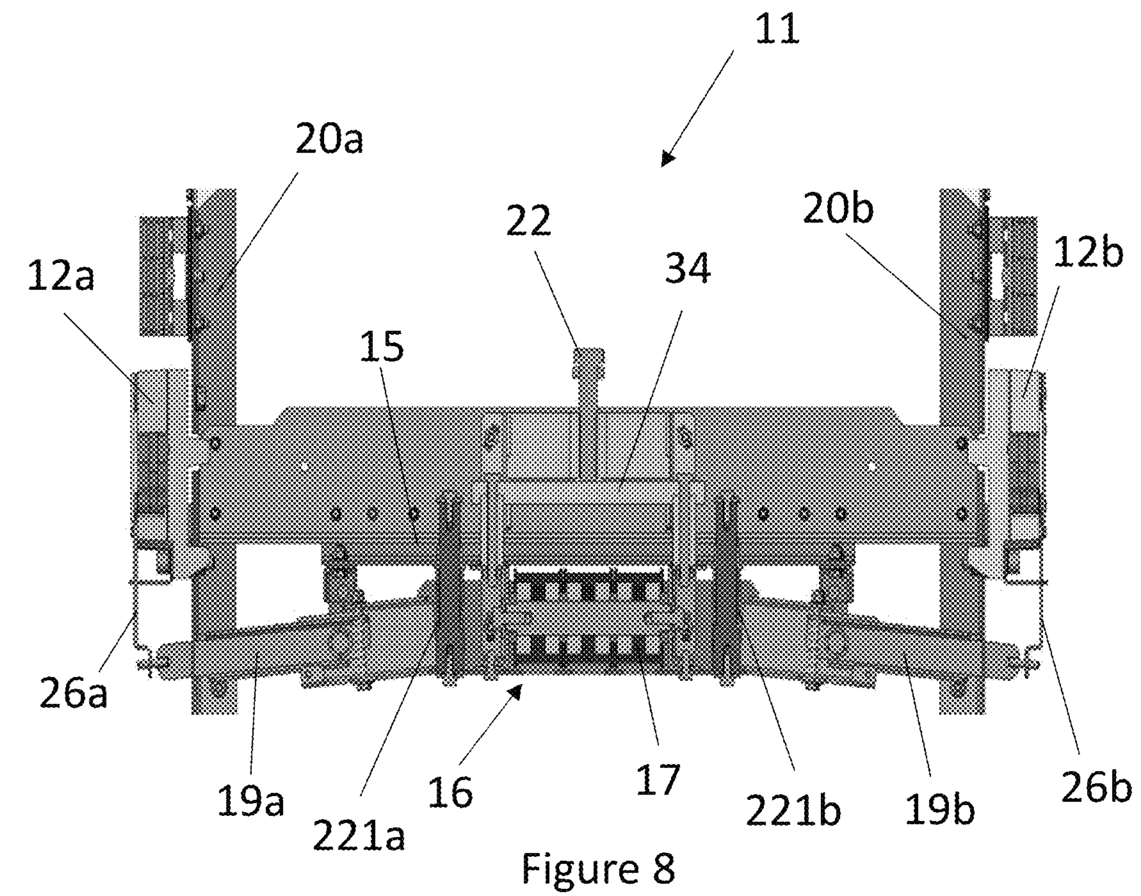
FIG. 8 is a cutaway view of the upper part of an elevator counterweight assembly according to the present disclosure, in the normal position.
Figure 9:
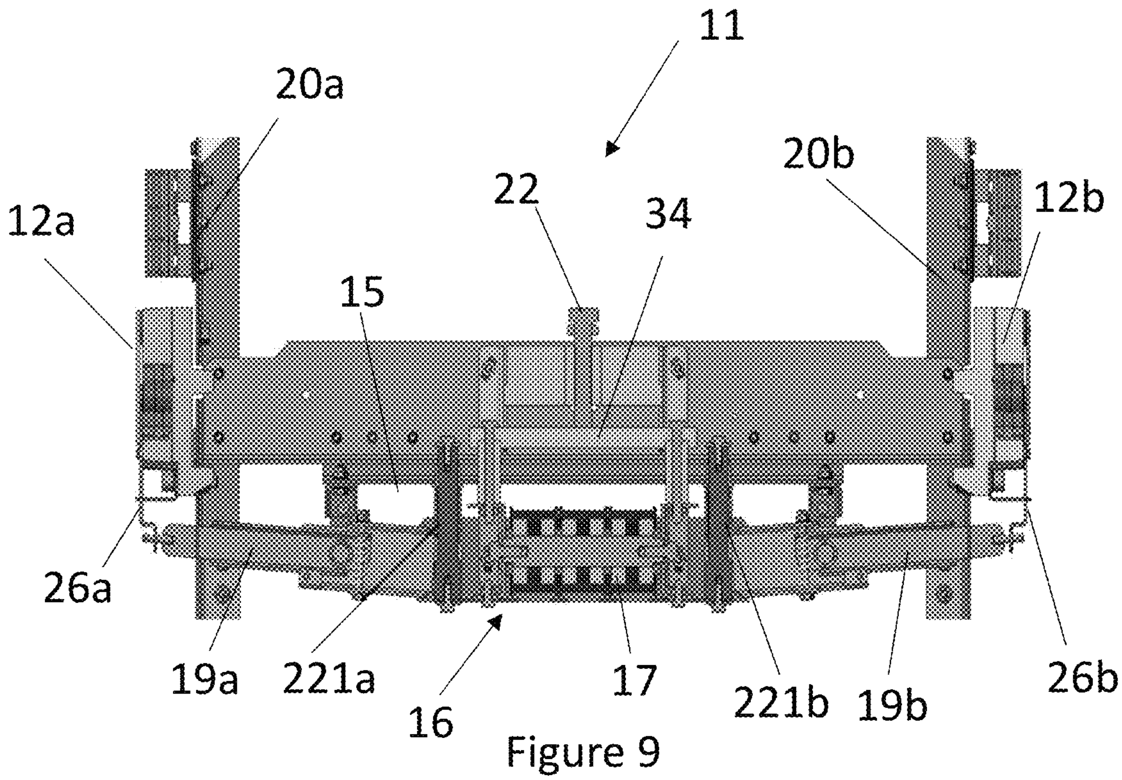
FIG. 9 is a cutaway view of the upper part of an elevator counterweight assembly according to the present disclosure, in the safety position.

FIGS. 8 and 9 show a cutaway view of the upper part of an elevator counterweight assembly 11 as shown in FIG. 5. FIG. 8 shows the mechanical actuator 22 in its normal, non-actuated position. FIG. 9 shows the mechanical actuator 22 in its actuated test position, and therefore the safety actuation mechanism 16 in the "safety" or "test" position, in which it can be checked whether the safety brakes 12*a*, 12*b* are actuated as they should be.

It can be seen in these Figures that the mechanical actuator 22 is connected to a pressure bar 34. The pressure bar 34 is contacted by the mechanical actuator 22 and is arranged to contact the safety actuation mechanism 16 in at least two positions. In the example shown, the pressure bar 34 is arranged to contact the connection 17, which in this example is a counterweight sheave 17, at opposing ends. This pressure bar 34 distributes the force which is applied by the mechanical actuator 22 so as to avoid localised wear or damage to a particular part of the safety actuation mechanism 16, or connection 17 (e.g. counterweight sheave).

In this example the mechanical actuator 22 is a screw mechanism, shown as a bolt, that can be manually actuated by turning, e.g. the mechanical actuator 22 is rotationally driven (by hand or a suitable tool) to produce a linear force on the safety actuation mechanism 16 (via the pressure bar 34). For example, a standard M20 bolt may be used. However, it will be appreciated that other types of mechanical actuator 22 may be employed instead. For example, the mechanical actuator 22 could be a ratchet or driving wedge.

In this example the mechanical actuator 22 is located centrally between the levers 19*a*, 19*b*. The pressure bar 34 is useful for spreading the force applied by a single mechanical actuator 22. A single mechanical actuator 22 takes up little space and can be arranged between the two suspension members 18 (as seen in FIG. 4). Furthermore, the mechanical actuator 22 conveniently provides a single actuation point for a maintenance person. However, it will be appreciated that in other examples there may be more than one mechanical actuator, operable independently or mechanically linked for simultaneous operation.

Figure 10:
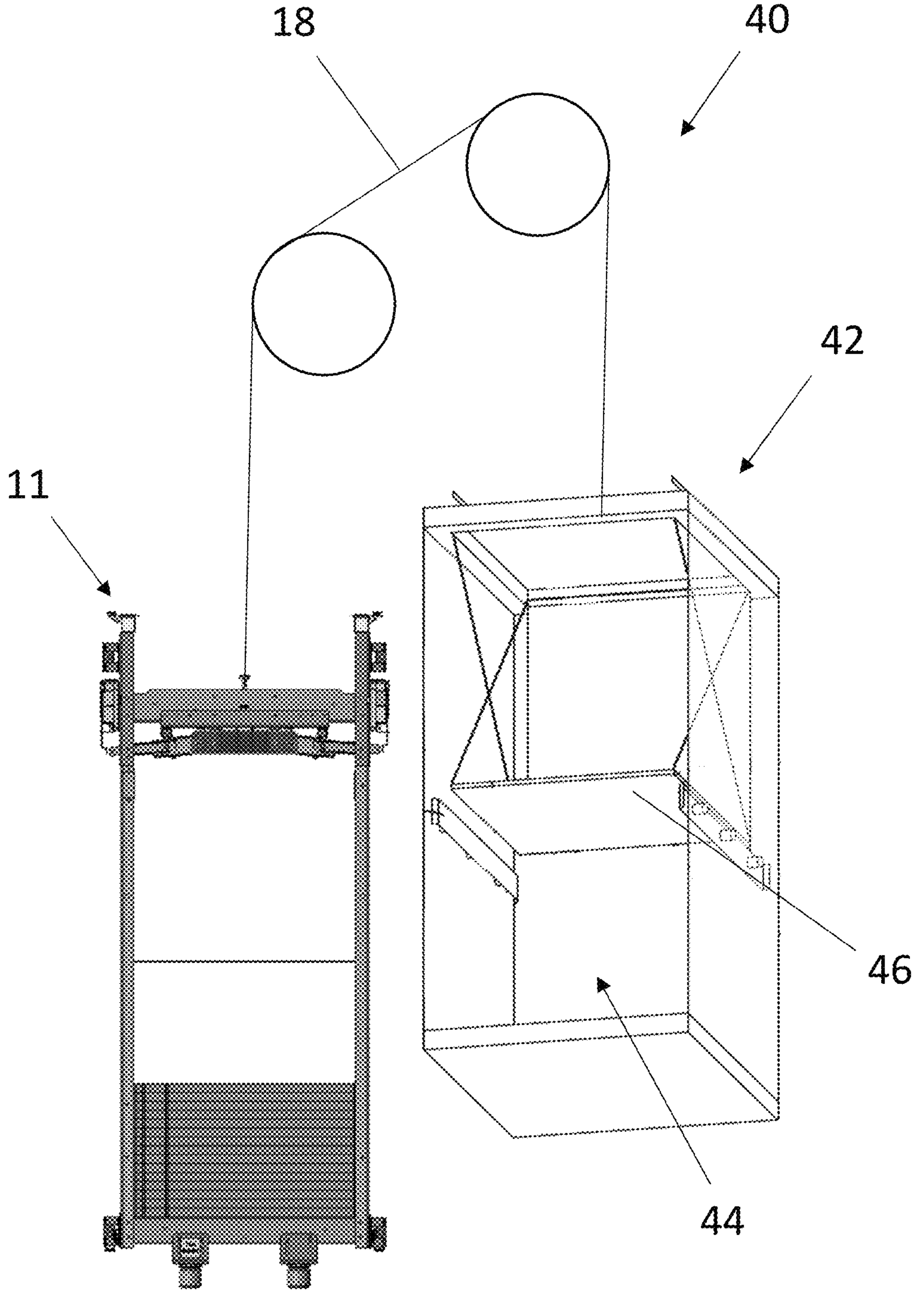
FIG. 10 is a schematic overview of an elevator system according to an aspect of the present disclosure.

FIG. 10 is a schematic view of an elevator system 40 according to the present disclosure. The elevator system 40 includes an elevator counterweight assembly 11 as described above, and also includes an elevator car 42. One or more suspension members 18 connect the elevator car 42 and the elevator counterweight assembly 11, in any suitable roping arrangement (e.g. 1:1 or 2:1 roping, etc.) As represented in the schematic drawing, the elevator car 42 defines an interior space 44. The elevator car 42 also includes a working platform 46 e.g. a foldable working platform. The working platform 46 is such that it can be moved from a stowed position at the top of the interior space 44, to an operational position within the interior space 44 (as seen in FIG. 10). In the operational position a maintenance person is able to stand on the working platform 46, and will partially protrude out of an opening in the top of the elevator car 42. In this position, standing on the working platform 46, the maintenance person is able to access many elevator components on which maintenance is to be carried out.

In particular, if the elevator car 42 and the elevator counterweight assembly 11 are brought to midrise i.e. both to a height which is half of the total hoistway height, such that the elevator car 42 and the elevator counterweight assembly 11 are adjacent to each other and approximately at the same height, a maintenance person standing on the working platform 46 can access the elevator counterweight assembly 11 for maintenance purposes.

In particular, the maintenance person is able to access the mechanical actuator 22 described above, and therefore to test the functioning of the safety actuation mechanism 16. The steps of the method for carrying out this handover test are:

A maintenance person moves the working platform 46 of the elevator car 42 into the operational position and climbs up onto the working platform 46.

From this position, the maintenance person accesses certain controls, and uses these controls to move the elevator car 42 and the counterweight 11 to the mid-rise position in the hoistway, so that they are adjacent to each other. In this position the maintenance person is able to easily access the mechanical actuator 22.

The maintenance person then actuates the mechanical actuator 22 (for example, the mechanical actuator 22 may be a bolt and the maintenance person may turn the bolt). The actuation (e.g. the tightening of the bolt) exerts a force on the safety actuation mechanism 16, which results in downwards relative movement of the safety actuation mechanism 16 with respect to the counterweight structure 38 (although relative to the hoistway it is actually the counterweight structure 38 which is moved upwards).

Once the mechanical actuator 22 is fully actuated (e.g. the bolt is fully tightened) the safety actuation mechanism 16 is in the safety or test position, in which the safety brakes 12*a*, 12*b* should be actuated.

The maintenance person then attempts to run the elevator car 42 upwards in the hoistway. This should create a slack in the belts 18 and trigger the counterweight safeties 12*a*, 12*b*, resulting in a stall of the elevator car, since the elevator counterweight assembly 11 is not moving, as its safety brakes 12*a*, 12*b* are engaged with the guide rails.

The maintenance person then visually checks the safety brakes and the position of the safety actuation mechanism 16, from their location on the working platform. Once the maintenance person has verified that everything is in order, they begin to release the mechanical actuator 22 e.g. by unscrewing the bolt by 3-5 mm. This is preferably sufficient to release the safety brakes.

The maintenance person then runs the elevator car 42 downwards in the hoistway, to check that the safety brakes 12*a*, 12*b* have disengaged correctly (if they have not disengaged correctly then the elevator car 42 will not move). Moving the car 42 downwards moves the elevator counterweight assembly 11 upwards. If the safety brakes 12*a*, 12*b* have not fully disengaged then, as the counterweight assembly 11 moves upwards, the maintenance person will hear a noise and can then stop the motion of the counterweight assembly 11. Moving the counterweight assembly 11 upwards ensures that the counterweight safeties 12*a*, 12*b* will not re-engage even if they had not fully released.

The maintenance person then fully releases the mechanical actuator 22, allowing the safety actuation mechanism 16 to return to its normal position.

Finally the maintenance person checks the position of all components of the elevator counterweight assembly 11, and if they have all returned to their original positions, the "handover" test for the counterweight is considered to have been passed.

It will be appreciated by those skilled in the art that the disclosure has been illustrated by describing one or more specific examples thereof, but is not limited to these aspects; many variations and modifications are possible, within the scope of the accompanying claims.

What is claimed is:

1. An elevator counterweight assembly (11), comprising:
- a counterweight structure (38);
- at least one safety brake (12*a*, 12*b*) mounted on the counterweight structure (38);
- a safety actuation mechanism (16), comprising a connection (17) for a suspension member (18), wherein the safety actuation mechanism (16) is configured to move, relative to the counterweight structure (38), between a normal position, and a safety position, wherein in the safety position the safety actuation mechanism (16) is arranged to actuate the at least one safety brake (12*a*, 12*b*) and thereby brake the counterweight structure (38); and
- a mechanical actuator (22) disposed vertically above the safety actuation mechanism, configured, when actuated, to apply a downward acting force to the safety actuation mechanism (16) and thereby move the safety actuation mechanism (16) from the normal position to the safety position, the mechanical actuator configured to be selectably actuated by rotating the mechanical actuator to produce the downward acting force and actuate the at least one safety brake to test operation of the safety actuation mechanism;
- wherein the safety actuation mechanism (16) comprises at least one lever (19*a*, 19*b*), wherein the at least one safety brake (12*a*, 12*b*) comprises a safety brake arm (26*a*, 26*b*), and wherein the at least one lever (19*a*, 19*b*) contacts the safety brake arm (26*a*, 26*b*), such that when the safety actuation mechanism (16) moves between the normal position and the safety position, the at least one lever (19*a*, 19*b*) is moved, thereby moving the safety brake arm (26*a*, 26*b*), which causes actuation of the safety brake (12*a*, 12*b*); and
- wherein the at least one lever pivots relative to the connection when moved between the normal position and the safety position.

2. The elevator counterweight assembly (11) of claim 1, wherein the mechanical actuator (22) is rotationally driven to produce a linear force.

3. The elevator counterweight assembly (11) of claim 2, wherein the mechanical actuator (22) comprises a screw mechanism.

4. The elevator counterweight assembly (11) of claim 1, wherein the mechanical actuator (22) maintains its position relative to the counterweight structure (38) unless actuated to move relative to the counterweight structure (38) and thereby apply a force to the safety actuation mechanism (16).

5. The elevator counterweight assembly (11) of claim 1, wherein the mechanical actuator (22) further comprises a pressure bar (34) configured to contact the safety actuation mechanism (16) in at least two positions, so as to distribute the force which is applied by the mechanical actuator (22) to the safety actuation mechanism (16).

6. The elevator counterweight assembly (11) of claim 1, wherein the safety actuation mechanism (16) comprises a first lever (19*a*) and a second lever (19*b*), wherein the first and second levers (19*a*, 19*b*) are located on opposing sides of the safety actuation mechanism (16), wherein the elevator counterweight assembly (11) comprises a first safety brake (12*a*), comprising a first safety brake arm (26*a*) contacted by the first lever (19*a*), and a second safety brake (12*b*) comprising a second safety brake arm (26*b*) contacted by the second lever (19*b*).

7. The elevator counterweight assembly (11) of claim 6, wherein the mechanical actuator (22) is located centrally between the first lever (19*a*) and the second lever (19*b*).

8. The elevator counterweight assembly (11) of claim 1, wherein the counterweight structure (38) comprises at least one weight (14) supported by a pair of uprights (20*a*, 20*b*), wherein the safety actuation mechanism (16) is mounted between the pair of uprights (20*a*, 20*b*).

9. An elevator system (40) comprising:
- an elevator car (42);
- an elevator counterweight assembly (11) according to claim 1; and
- a suspension member (18) connected to the elevator car (42) and to the connection (17) of the safety actuation mechanism (16).

10. The elevator system (40) of claim 9, wherein the elevator car (42) defines an interior space (44) for accommodating passengers and/or cargo, the elevator car (42) comprising a working platform (46) moveable between a stowed position, above the interior space (44), and an operational position, suspended within the interior space (44).

11. A method of carrying out a handover test for an elevator counterweight assembly (11), the method comprising:
- selectably actuating a mechanical actuator (22) disposed vertically above a safety actuation mechanism to apply a downward acting force to the safety actuation mechanism (16), comprising a connection for a suspension member (17), and thereby move the safety actuation mechanism (16), relative to a counterweight structure (38), from a normal position to a safety position, wherein in the safety position the safety actuation mechanism (16) is arranged to actuate at least one safety brake (12*a*, 12*b*) and thereby brake the counterweight structure (38), the mechanical actuator configured to be selectably actuated by rotating the mechanical actuator to produce the downward acting force and actuate the at least one safety brake to test operation of the safety actuation mechanism; and
- checking that the at least one safety brake (12*a*, 12*b*) is correctly actuated;
- wherein the safety actuation mechanism (16) comprises at least one lever (19*a*, 19*b*), wherein the at least one safety brake (12*a*, 12*b*) comprises a safety brake arm (26*a*, 26*b*), and wherein the at least one lever (19*a*, 19*b*) contacts the safety brake arm (26*a*, 26*b*), such that when the safety actuation mechanism (16) moves between the normal position and the safety position, the at least one lever (19*a*, 19*b*) is moved, thereby moving the safety brake arm (26*a*, 26*b*), which causes actuation of the safety brake (12*a*, 12*b*); and
- wherein the at least one lever pivots relative to the connection when moved between the normal position and the safety position.

12. The method of claim 11, wherein actuating the mechanical actuator (22) comprises driving the mechanical actuator (22) rotationally, to produce a linear force.

13. The method of claim 12, wherein the mechanical actuator (22) comprises a screw mechanism, and the method further comprises actuating the screw mechanism using a tool engaged with the screw mechanism.

14. The method of claim 11, the method further comprising moving an elevator car (42) in a hoistway to be adjacent to the elevator counterweight assembly (11); and deploying a working platform (46) within the elevator car (42), the working platform (46) being in an operational position, allowing a person standing on the working platform (46) to access the mechanical actuator (22) of the elevator counterweight assembly (11).

* * * * *